267. SPRING DEVICES.

BEST AVAILABLE COPY

T. H. WOOD.

Carriage-Springs.

No. 6,018. Reissued Aug. 18, 1874.

Fig: 1

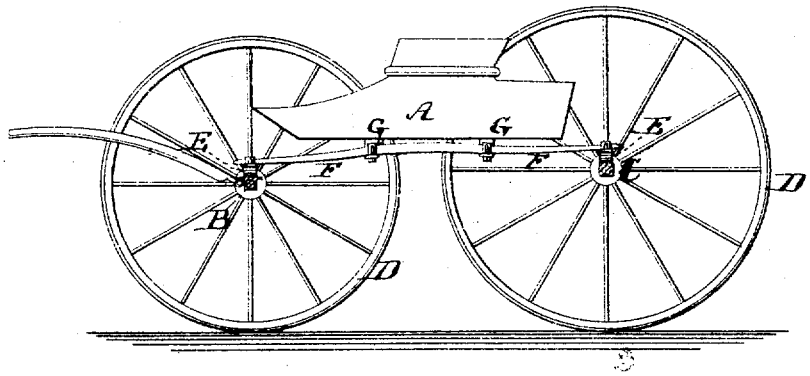

6,018. CARRIAGE-SPRINGS. Thos. H. Wood, New York, N. Y., assignor to J. B. Brewster & Co., same place. Patent No. 139,348, dated May 27, 1873. [Filed July 29, 1874.]

The side bars are supported upon downwardly-bowed semi-elliptic springs, and the springs interposed between axle bars and the carriage are [illegible] and semi-elliptic.

The semi-elliptic springs G G [illegible] between the side bars F F and [illegible] body, all combined substantially as [illegible]

Fig: 2.

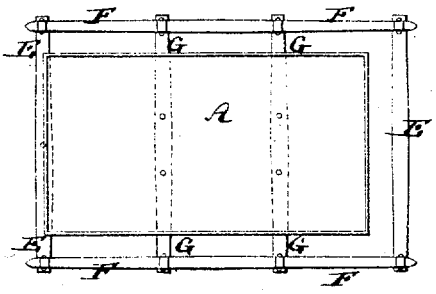

*Witnesses:*

A. Moragne
Ele W Bell

*Inventor:*

Thos. H. Wood
by his attorney
A. V. Briesen

THE GRAPHIC CO. PHOTO-LITH. 39 & 41 PARK PLACE, N.Y.

UNITED STATES PATENT OFFICE.

THOMAS H. WOOD, OF NEW YORK, N. Y., ASSIGNOR TO J. B. BREWSTER & CO., OF SAME PLACE.

IMPROVEMENT IN CARRIAGE-SPRINGS.

Specification forming part of Letters Patent No. 139,348, dated May 27, 1873; Reissue No. 6,018, dated August 18, 1874; application filed July 29, 1874.

*To all whom it may concern:*

Be it known that I, THOMAS H. WOOD, of New York, in the county and State of New York, have invented a new and useful Improvement in Carriage-Springs, of which the following is a specification.

Figure 1 is a side elevation of a vehicle having my improved spring. Fig. 2 is a plan view of the same.

Similar letters of reference indicate corresponding parts in both figures.

This invention has for its object to improve the manner of connecting the bodies of light carriages with the side bars, whereby they are supported; and it consists in interposing a pair of semi-elliptic springs between said side bars and the wagon-body.

In the accompanying drawing, the letter A represents the body of a light carriage of suitable style. B and C are the axles of the carriage, and D D the wheels. The axles are connected, by springs E E or otherwise, with the side bars F F. These side bars are made of hickory wood or other material. To the under side of the carriage-body A are secured transverse springs G G, whose ends connect, by suitable couplings, with the side bars F F, as is clearly shown in the drawing. These springs G G can be made of metal or other material, and are semi-elliptic or flat springs, in contradistinction to the full elliptic springs heretofore used, as direct supports for carriage-bodies on their axles.

I claim as my invention—

The semi-elliptic springs G G, interposed between the side bars F F and the wagon-body, all combined substantially as specified.

Witnesses: THOS. H. WOOD.

A. V. BRIESEN,

E. C. WEBB.